HARLEY A. PERKINS, JR.
INVENTOR.
BY Roger A. Bonney
ATTORNEY

HARLEY A. PERKINS, JR
INVENTOR.
BY [signature]
ATTORNEY

HARLEY A. PERKINS, JR

INVENTOR.

BY Roger S. Borovoy

ATTORNEY

United States Patent Office 3,331,058
Patented July 11, 1967

3,331,058
ERROR FREE MEMORY
Harley A. Perkins, Jr., Los Altos, Calif., assignor to Fairchild Camera and Instrument Corporation, Syosset, N.Y., a corporation of Delaware
Filed Dec. 24, 1964, Ser. No. 421,053
3 Claims. (Cl. 340—172.5)

ABSTRACT OF THE DISCLOSURE

A memory device having normal storage positions and spare storage positions and a logic system for decoding the address of a defective position and substituting the spare memory position for the defective position by a simple logical operation. The resulting memory substantially improves production memory yields, for the system is tolerant of a reasonable number of defective positions, and yet is still perfectly good.

This invention relates to a memory device and more particularly to an error correcting apparatus for a memory device embodying a technique for substituting a good storage site for a defective one.

In the computer art, core arrays are one of the most common forms of memory device. These arrays comprise thousands of minute torroidal ferrite cores having drive, sense, and sometimes inhibit windings coupled to each core and to a multiplicity of cores. Such an arrangement is difficult to manufacture because of the intricate stringing operation necessary to assemble an array of cores. The occurrence of errors in the stringing or defects in the individual torroidal core structure is not uncommon. The removal or repair of such errors or defects has been absolutely necessary because a programmed computer system cannot tolerate faulty information from its memory device. The reliability and accuracy of the information stored in the memory device directly affects the accuracy of any computer computation. Repairs are both time consuming, costly, and most difficult.

The above problems of correcting errors in the manufacture of core array memories are even more pronounced in the case of thin film memories. The manufacture of these memories generally involves a series of successive vacuum deposition and etching operations. The existence of a fabrication imperfection has not to date been readily susceptible to repair because of the nature of the manufacturing operation. Similarly other advanced memory techniques, such as cryotrons, do not permit the substitution of a replacement site in an existing array. Thus the alternatives in these devices have been to disregard imperfect memories, to sacrifice the all important accuracy requirement, or to use some sort of error coding technique.

There have been a number of prior attempts in computer systems to compensate for errors in information transmission by including systems which implement the well known Hamming code (see "Error Detecting and Error Correcting Codes" by R. W. Hamming, Bell System Technical Journal, Vol. 26, No. 2, April 1950, pages 147–160) or other similar codes. Such systems employ redundant data. By logical analysis using suitable networks, the redundant data is employed to correct the erroneous information. The networks employed in such systems are relatively complex, introduce appreciable delay in the operation of the memory device, and add significant costs to the system.

This invention solves the problem of memory repair and accuracy without the complexity and delay of prior art error correcting devices. It is applicable to all memory devices, but is especially important in the case of advanced memory devices, such as thin film devices.

The invention provides a memory device including data words divided into data storage positions, spare positions for storage when a defective data storage section exists, and address positions for locating or addressing any defective position. Coupled to the memory device is a logic means for decoding the address of a defective position and for enabling the device to operate with the spare position receiving and transmitting data as if no fault or defect exists. To this end, a logic means functions to shift the input data into spare positions when a defective position exists and to read the data out from the spare position as if the faulty position did not exist. The logic means utilizes the bad bit knowledge obtained during inspection in accomplishing the shifting. The spare position shifting makes the correction and repair of defective bits unnecessary. The cost of providing the extra spare and address bits and the circuitry to accomplish this shifting is minimal when compared with the cost of discarding whole thin film arrays or repairing core arrays. In addition, the shifting technique requires very little time as compared with a system implementing the Hamming code.

The above structure and advantages will be more completely understood and appreciated from the detailed specification taken in conjunction with the figures, wherein.

Figure 1:
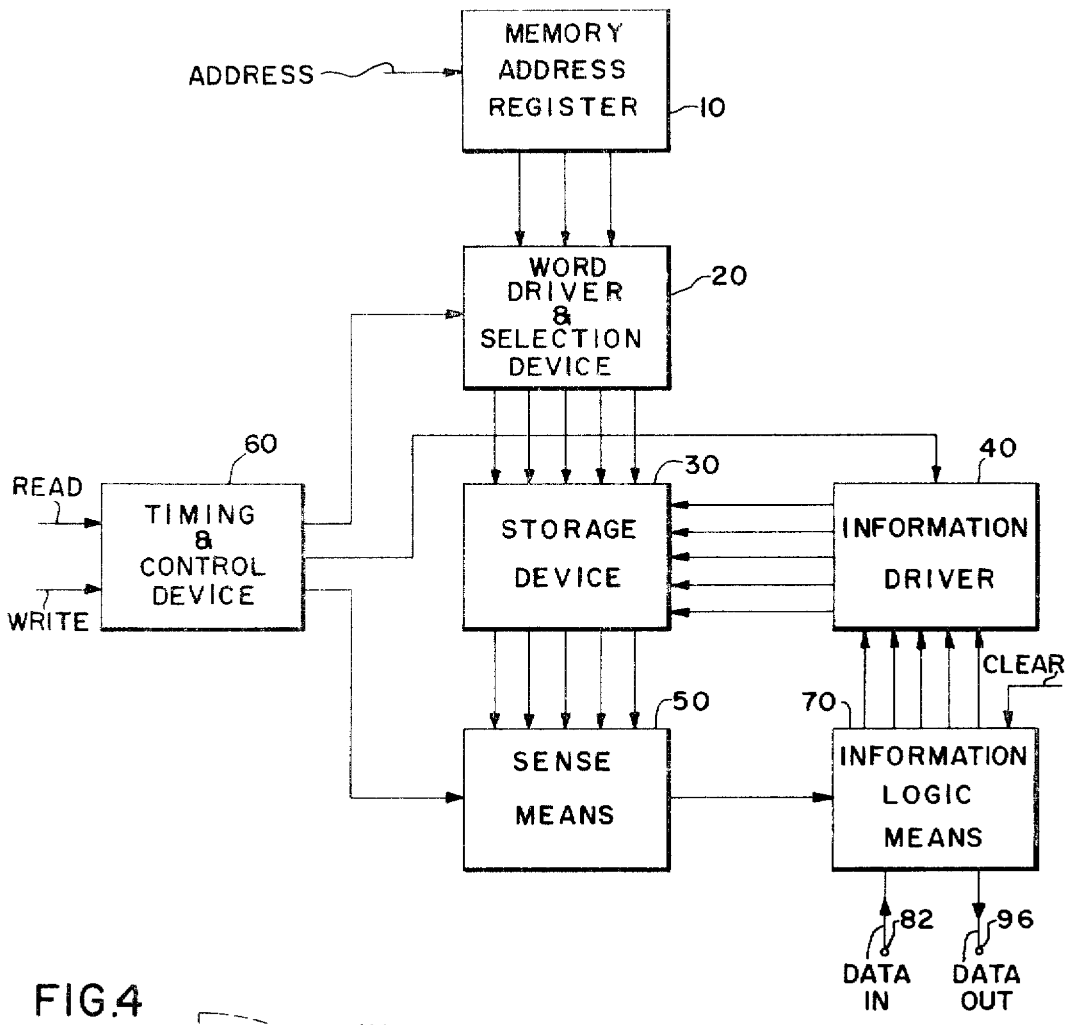
FIG. 1 is a schematic block diagram of a memory system.

The arrangement of a memory system is shown in FIG. 1. Such systems are well known and described in U.S. Patent 2,988,732, issued to A. W. Vinal on June 13, 1961, and U.S. Patent 3,049,692, issued to W. A. Hunt on Aug. 14, 1962. Briefly, a memory system comprises a memory address register 10, word driver and selection device 20, storage device 30, information driver 40, sense means 50, timing and control device 60, information logic means 70. The register 10 may commonly take the form of a bank of flip flop circuits which temporarily store address information which is supplied with an input signal representative of a particular position in storage device 30. The output of the memory address register 10 is connected to the word driver and selection device 20 which may be a diode matrix decoder that is enabled by the register 10 to selectively energize certain of its outputs. Such selection devices are well known in the art and typical constructions are shown in U.S. Patent 2,902,677, issued on Sept. 1, 1959, to R. G. Counihan and U. S. Patent 3,015,813, issued on Jan. 2, 1962, to W. V. Tyrlick. The selection device 20 has its outputs connected to storage device 30. The storage device 30 also has inputs supplied by the information driver 40 which in turn is controlled by the inputs from logic means 70. The output of storage device 30 is connected to sense means 50 which has its output connected to output terminal 96 via logic means 70. The selection device 20, information driver 40, and sense means 50 are connected to device 60 for controlling the synchronization of these units.

The storage device 30 may take the form of a core array such as the one shown in U.S. Patent 2,736,880 issued to J. W. Forrester on Feb. 28, 1956, or a thin film memory array such as those described in the article "Magnetic Film Memories" by A. V. Pohn, IRE Trans. Elec. Computers, vol. 9, pages 308–314, 1960. Typically, one of these storage devices comprises an array of discrete positions organized into rows and columns. The discrete positions are capable of assuming at least two stable states so that binary information may be stored. In one embodiment, there are 1,024 rows of these positions, which may be divided into two memory planes of 512 rows each. Each row has 76 positions to form a 76-bit word. These positions are arranged in columns so that there are 76 columns. The rows may be considered as parallel to a longitudinal or easy axis of a film magnetic storage position, while the columns are parallel to a transverse axis of the storage position.

In accordance with well known techniques, selected discrete positions in the storage device 30 are oriented in a first or second direction to store binary information in given positions during a write operation. This is accomplished by the cooperation of the word driver and selection device 20, information logic means 70, and information driver means 40. The specific manner in which these well known components cooperate will depend upon the particular memory elements employed in the storage device. The selective energization of cores is discussed in above referred to U.S. Patent 2,736,890, while a discussion of the selective energization of thin film elements appears in the above referred to article "Magnetic Thin Film Memories." The selective energization of other magnetic elements, such as cryotrons or twisters, is also well known and adequately discussed in the literature. In view of this as well as the unimportance of a specific energization in arrangement to the invention, further description of such arrangements is thought to be unnecessary.

Readout from the storage device 30 is accomplished by a sense means 50 having sense windings coupled to the positions of the storage device 30. The typical sense means comprises sense coils, amplifiers and gates that are strobed by a timing and control device 60. Timing and control device 60 synchronizes and controls the various units according to well known techniques like the writing of information into the magnetic storage device, the readout of information is well known for the various elements and the specific arrangement is not particularly important to the invention.

Figure 2:
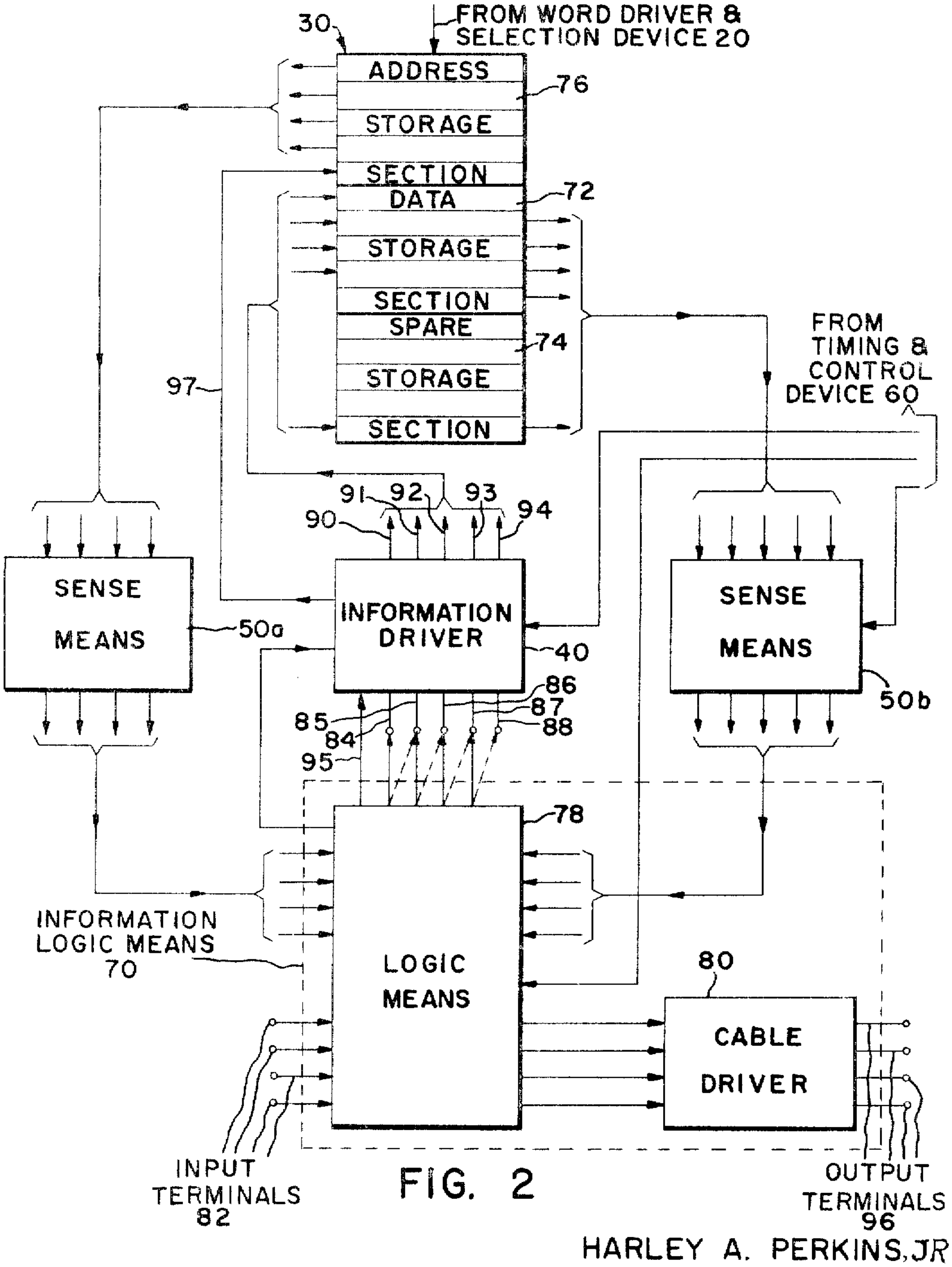
FIG. 2 is a more detailed block diagram of the part of the system that accomplishes the shifting technique, which forms part of the system shown in FIG. 1.

With the above generally described memory system in mind, the structure and operation of the invention portion of the magnetic storage system can be better understood. It is stressed that the paricular units, components, and elements of the memory system are of relatively little importance. It is the organization and arrangement of certain of these components that is of greater significance. FIG. 2 shows the portions of a magnetic film memory system that are most important in the operation of the invention and the interconnection of this portion of the system.

Referring o FIG. 2, any word of the storage device 30 is divided into three sections: a data storage section 72 for the regular storage of data or information, a spare storage section 74 for the storage of data when the data storage section has a defective position, and an address storage section 76 for the storage of the address of the defective position in the data storage section. The storage sections 72–76 each include a plurality of discrete positions for the storage of information, but is within the broad scope of the invention to have only one position in a particular section. A position is defined for purposes of this description as containing one storage element, but it is understood that this definition is only selected to facilitate the description. The sections 72–76 may be rearranged in many different ways. For example, there may be a few positions in the data storage section followed by a few positions in the spare storage section followed by further data storage section positions, or there may be a main data storage section with spare storage sections on both ends or perhaps one midway in the data storage section. Similarly, the address storage section may be dispersed and rearranged. In a preferred embodiment, the data storage section comprises eight sections with eight positions per section, while the spare storage section is one eight-position section and the address section is a four-position section, giving a total of 76 positions per word. The four position address section is sufficient to locate and address any of the eight sections in the data storage section, while the spare storage section is sufficient to provide storage in the case of one defective section. A section is defective when one of its positions is defective. It should be understood that additional spare storage sections and additional address capacity may be provided, but in the great majority of cases one spare storage section adequately provides for defects in the fabrication of the data storage section.

The address storage section 76 is connected to the sense means **50*a* while data storage section 72 and spare storage section 74 are connected to sense means 50*b*. Sense means 50 of FIG. 1 is shown broken into two sections 50*a* and 50*b* for the purpose of simplifying the drawing. Sense means 50*a* senses the information stored in the address storage section 76 when a readout operation is commenced and supplies an output signal representative of the stored address. The sense means 50*b* senses the data stored in the data storage section 72 and the spare storage section 74** and supplies an output representative of the stored data.

The outputs from the sense means **50*a* and 50*b* are both supplied to a logic means 78 which forms part of the information logic means 70 (FIG. 1). Broadly speaking, the logic means 78 decodes any stored address and enables information driver means 40 to store data in the spare storage section 74 if a defective position exists in data storage section 72 as indicated by the decoded address. The output cable driver means 80 is also enabled by logic means 78 to read out information from spare storage section 74 as if the stored information were located in the defective position of data storage section 72. More specifically, the logic means 78 has signals supplied by sense means 50*a* and 50*b* and has input terminals 82 connected to supply incoming data thereto. In the case of a read operation, the logic means 78 has its output connected to the output cable driver means, such as output amplifier means 80, while its output is connected to the information driver 40** in the case of a write operation.

The information driver 40 has a plurality of input terminals 84 through 88. When no defective position exists in the data storage section 72, the logic means outputs are coupled to the input terminals 84–87 while the input terminal 88 remains disabled. When a defective position exists in the data storage section 72, one of the terminals 84–87 will remain disabled and the terminal 88 will be enabled. The terminal 88 is associated with the spare storage section 74 so that when terminal 88 is enabled, the output 94 from the information driver 40 to the spare storage section 74 will also be enabled. Similarly, when inputs 84–87 are enabled, the outputs 90–93, respectively, will also be enabled, while the output 94 to spare storage section 74 will remain disabled. The switching of the inputs 84–88 is schematically shown in FIG. 2 by the broken lines. It should be understood that the enabling of the appropriate inputs and outputs is accomplished by electronic or solid state gate circuitry to be described later in the specification. In operation, during a write operation, the inputs to the information driver 40, which are enabled, and consequently the outputs which are enabled, are controlled by the logic means 78 in accordance with the signals supplied from address storage section 76 by sense means **50*a*. The energization levels of the outputs are determined by input signals supplied to input terminals 82**.

Logic means 78 also has an output 95 connected as an input to information driver 40 which in turn enables output 97 from information driver 40. This input and output transfers the address storage section information from the logic means 78 to the information driver 40 and then to address storage section 76. A single input 95 to a single output 97 from driver 40 are shown for the purposes of simplification.

The transfer of data from the data storage section 72 and spare storage section 74 to logic means 78 via sense means **50*b* occurs only during a read operation. In the embodiment shown in FIG. 2, there are four output conductors from data storage section to sense means 50$b$ and one output conductor from spare storage section 74 to sense means 50$b$. The sense means 50$b$ has five output conductors connected to logic means 78 while the logic means 78 has only four output conductors connected to cable driver 80. Logic means 78, regardless of whether the four data storage section conductors or the spare storage section conductor and three data storage section conductors are energized, will supply the same output information to cable driver 80. It will therefore make no difference to the output terminals 96 and to the output component (card punch, tape unit, etc.) connected thereto whether the data was stored in data storage section 72 or spare storage section 74**. It should be understood that the number of conductors recited above is for purposes of explanation and simplicity only.

With the interconnection of the components of the system of FIG. 2 in mind, a better understanding of its functioning can be obtained by considering a typical operational sequence. First, a write operation will be considered with a defective position in the data storage section 72 associated with information driver output 91. It is assumed that during inspection, after fabrication of a magnetic storage device 30 having associated with it a word driver and selection device 20, the defective position associated with output 91 of information driver 40 was located and the address of this position was stored in address storage section 76. During the write operation, the defective position address stored in address storage section 76 is first read out by sense means 50$a$. The output of the sense means 50$a$ is supplied to condition the logic means 78 so that the input data which is supplied to terminals 82 of the logic means and which would have been written into section 72 but for the defect can be supplied to positions which are not defective. In this example, the logic means 78 is conditioned so that the data supplied to its input terminals 82 is transmitted only to input terminals 84, 86, 87, and 88 of information driver means 40. The data is not supplied to input terminal 85 associated with output terminal 91 (the output associated with the defective position); however the data may also be supplied to the defective position without interfering with storage in the non-defective positions. With input data supplied to terminals 84 and 86–88, the information driver 40 will energize the outputs 90, 92, 93, and 94, resulting in data storage in section 72 in all of the positions but the defective position, and storage of the data otherwise to be stored in the storage position associated with output 94 in the spare storage section 74.

In the above embodiment, the data which normally would have been supplied to terminal 85 is shifted to terminal 86 and similarly the data which normally would have been supplied to terminals 86 and 87 are shifted to terminals 87 and 88, respectively. Alternatively, it is possible to have the logic means constructed so that the data that was to be supplied to terminal 85 is shifted directly to terminal 88 rather than the shifting described. It should be noted that the address read from the address storage section 76 is returned to the address storage section 76 via the logic means 78, output line 95, information driver 40, and output line 97. During all these operations, the transverse driver and selection device 20 has been properly energized and synchronized by the timing and control section 60 acting in cooperation with the memory address register 10 (FIG. 1).

The data stored in data storage section 72 and spare storage section 74 in accordance with the above described operation, will eventually be read from the storage memory device. It is necessary that the information read from these two sections 72 and 74 be supplied to output terminals 96 as if the data were stored in the defective position of data storage section 72. To this end, sense means 50$b$ acts in cooperation with word driver and selection device 20 (FIG. 1) and information driver 40 to sense the data stored in data storage section 72 and space storage section 74 and to supply a representative output signal to logic means 78. Simultaneously, or reasonably so, the address in the address storage section 76 is transmitted to logic means 78 by sense means 50$a$. This address input conditions logic means 78 so that the inputs from sense means 50$b$ are supplied to the output from logic means 78 and to cable driver 80 as if the data were stored in a data storage section having no defective position. The cable driver 80 supplies the readout data to output terminals 96.

From the above description, it can be seen that a memory storage device has been provided which compensates for defects in fabrication or manufacture of magnetic storage devices by providing a word organization that includes a spare storage section and an address storage section. This word organization coupled with suitable logic means avoids storage in defective positions and enables imperfections in the magnetic storage device to be corrected for. This is accomplished with the addition of a minimum of extra equipment and a minimum of delay in the operation of the storage device.

Figure 4:
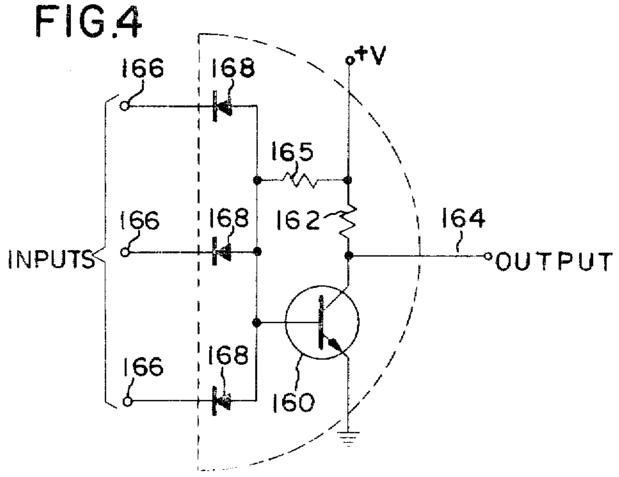
FIG. 4 is a circuit diagram for a typical logic element that may be employed in the logic means of FIG. 3.
Figure 3:
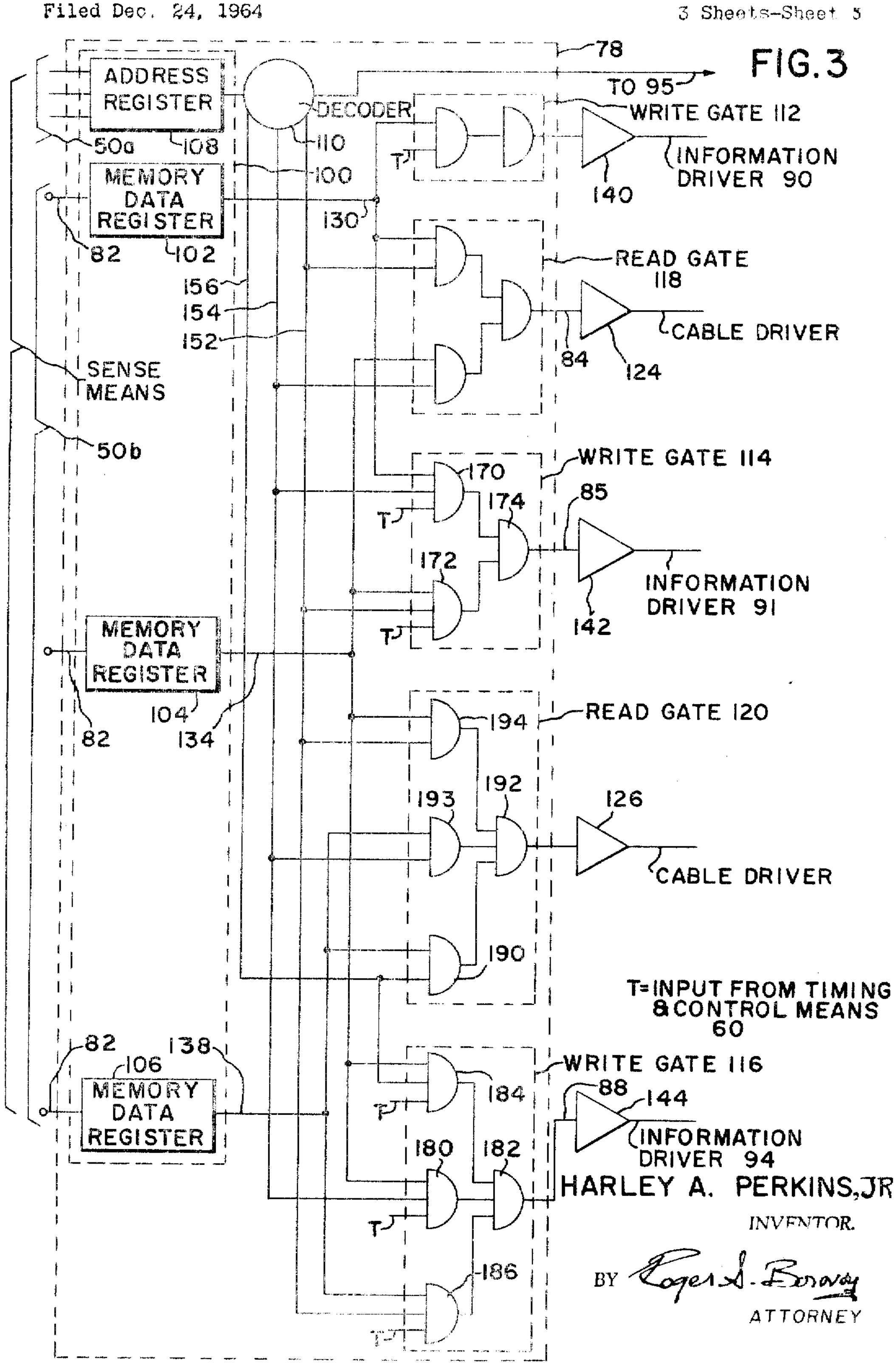
FIG. 3 is a more detailed logic diagram of the logic means shown in FIG. 2.

A typical logic means 78 for performing the above-described functions is shown in FIGS. 3 and 4. There are, of course, other logic arrangements and organizations for accomplishing the same functions which are within the broad scope of this invention. For the purpose of simplification, the logic arrangements for only two positions in the data storage section and one position in the spare storage section are considered.

Referring to FIG. 3, logic means 78 comprises memory register 100 that includes the memory data register 102–106 and address register 108. The memory data registers 102–106 have their input terminals connected to the sense means 50$b$ (not shown) while the address register 108 has its input terminals connected to sense means 50$a$ (not shown). It should be noted that the sense means 50$b$ is connected to essentially the same input terminals that the incoming data is supplied to. These registers 102–106 are operative during the read and write operations. The registers 102–108 may take the form of a bank of flip-flops that would store a plurality of bits. These memory data registers 102–106 and address register 108 are primarily for the temporary storage of data that is being transferred to and from the storage device.

Address register 108 has its output connected to a decoder 110 for decoding the addresses temporarily stored in the address register 108 and for enabling the write gate means 112–116 and readout gates 118 and 120 connected to the outputs of decoder 110. Decoders are well known in the art and are described in such patents as U.S. Patent 3,015,813 issued to W. V. Tyrlick on Jan. 2, 1962. These decoders generally convert a coded signal received from an address register into pulses that are carried along a plurality of conductors, such as the outputs from the decoder, to enable a pre-selected group of elements such as the write gates 112–116 and readout gates 118 and 120.

The decoder 110 has a plurality of outputs 152, 154, and 156 that are connected to write gates 112–116 and to read gates 118–120. The output 152 and 154 are connected to gates 114–120, while output 156 is connected to gates 116 and 120. The output signals from decoder 110 enable the write gates 112–116 in accordance with the address stored in the address storage section 76 (FIG. 2) so that storage in operative positions of the data storage section is effected. The output signals from decoder 110 connected to read gates 118 and 120 enable these gates to couple the memory data registers 102–106 to the appropriate cable drivers, such as output amplifiers 124 and 126. More particularly, cable drivers 124 and 126 are supplied with output signals as if a defective position did not exist in the data storage section 72 (FIG. 2). The cooperation between the readout gates 118 and 120, memory data registers 102–106, and cable drivers 124 and 126 will be considered in further detail later in the specification.

Considering the portion of the system active during the write operation, memory data register 102 has output 130 connected to write gate 112, to write gate 114, and to read gate 118. Memory data register 104 has output 134 connected to write gates 114, and 116, and to read gates 118 and 120. Memory data register 106 has output 138 connected to write gate 116 and to read gate 120. The write gates 112, 114, and 116 are connected to information drivers 140, 142 and 144, respectively. From this, it can be seen that data stored in memory data register 102 may be transmitted through write gate 112 or 114 to drivers 140 or 142, respectively. Memory data register 104 may transmit an output signal through write gate 114 or 116 to drivers 142 or 144, respectively. Memory data register 106 transmits its output signal through write gate 116 to driver 114. When there is no defective position in the data storage section associated with write gate 112, then the signal from memory data register 102 will be transmitted to driver 140 via gate 112 and the signal supplied by memory data register 104 will be supplied to driver 142 via write gate 114. The supplying of an appropriate input signal from decoder 110 to write gate 114 will result in the signal which would ordinarily be supplied by gate 112 to driver 140 being supplied to driver 142 via gate 114. This shifting of signals results when the data storage section associated with gate 112 and driver 140 is defective, necessitating that the input signal be supplied to a different data storage section or to the spare storage section. The normal coupling of the register 104 to driver 142 via write gate 114 is changed when the output from register 102 is shifted to write gate 114. When this change occurs, the memory data register 104 supplies its output signal to write gate 116. Write gate 116 is associated wtih the spare storage section 74 (FIG. 2).

Information driver 40 (FIG. 2) and more particularly information drivers 140–144 (FIG. 3) associated with the write gates are connected to the magnetic storage device 30 (FIG. 1). Inhibit drivers, amplifiers, logical inverters, and a host of equivalent devices may be used as information drivers depending upon the particular storage device employed. These drivers 140–141 are separate means with drivers 140 and 142 associated with the data storage sections, and driver 144 associated with the spare storage section. Thus, the write gates are means for normally coupling the memory data registers 102 and 104 to the drivers 140 and 142 associated with the data storage sections and for shifting this coupling to couple the driver 144 associated with the spare storage section 74 (FIG. 2) to memory data register 104 when the data storage section has a defective position.

Considering the portion of logic means 78 (FIG. 2) active during the readout operation, the memory data register 102 is connected to output driver 124 via read gate 118. Similarly, the register 106 is connected to output driver 126 via gate 120. The register 102 is connected to output drivers 124 and 126 by read gates 118 and 120, respectively. This allows the data from register 104 to be supplied to either driver 124 or 126 depending on whether a defective position exists. The decoder 110 with its output lines 152 and 154 connected to read gate 118 and output lines 152, 154 and 156 connected to read gate 120 controls the manner in which data passes from the registers 102–106 to the drivers 124–126 via the gates 118 and 120.

With the general organization of the registers, decoder, gates and drivers in mind, the specific details of the read and write gates, along with a typical logical element that may be employed in these gates, will be considered. The logical element employed in the read and write gates may be any of the well known and commonly used logical devices. The specific one described here has many equivalents and is selected primarily for purposes of facilitating this description. The logical element is designated in FIG. 3 by half circles within the gates 112–120. The specific circuitry associated with the logic element is shown in FIG. 4.

In essence, this logic element of FIG. 4 is a form of a NOR logic circuit with an output of a plus voltage (that may arbitrarily be designated as "one") if any of the several inputs is "zero" and a lower output voltage (arbitrarily designated as "zero") if all of the inputs are plus voltages. In other terms, the logic element is an inverting element which performs an AND logic function for relatively positive inputs and an OR logic function for relatively negative inputs. With a single input connected, it is simply a logic inverter. Referring specifically to the circuit diagram in FIG. 4, transistor 160 is an NPN transistor that has its emitter grounded and its collector connected to a plus voltage source (+V) via a resistor 162. When any of the input terminals 166, connected to the base of the transistor 160 via diodes 168, are supplied with a "zero," the transistor 160 is in a non-conducting condition so that substantially all of the plus voltage (+V) is coupled to the output terminal 164. As long as one of the input terminals 166 is connected to ground or a negative voltage with respect to the emitter, the base will not be sufficiently positive to cause the transistor 160 to become conductive. When the base of the transistor 166 becomes positive with respect to its grounded emitter, it will conduct. When a positive voltage is applied to all of the terminals 166, the diodes 168 will be biased in an OFF condition, resulting in the plus voltage (+V) being applied to the base of the transistor 160 via a resistor 165. With this plus voltage (+V) applied to the base of the transistor 160, it becomes conductive and the voltage at the output terminal 164 will approach ground or the voltage designated as "zero." From this, it can be seen that when all the input terminals 166 have "ones" (plus voltages) connected thereto, the output terminal 164 will have a "zero" output. When a "zero" input is at any one of the input terminals 166, the signal at output terminal 164 will be a "one" (plus voltage). The circuit shown in FIG. 4 thereby functions to perform the AND, OR, and inverting functions.

With the specific structure of the logic element in mind, the interconnection of many of these elements and their operation in functioning as gates will be considered, referring again to FIG. 3. The construction and operation of write gate 114 will be considered as exemplary of gate construction and operation. Once the construction and operation of this gate is understood, then the construction and operation of the remaining gates will be obvious to one of ordinary skill in the art. The write gate 114 has three logical elements 170, 172, and 174 connected as shown in FIG. 3. The elements 170 and 172 have their outputs connected to the input of gate 174, while the output of gate 174 is connected to information driver 142 via output 85. The element 170 has inputs from memory data register 102, decoder line 154, and timing and control line T. The element 172 has inputs from output line 134 of memory data register 104, decoder line 152, and timing line T.

In operation, when the storage position associated with information driver 142 is not defective and a data transfer is to occur from memory data register 104 to information driver 142, then line 152 of decoder 110 coupled to element 172 is activated with a plus voltage, along with the timing line T from timing and control device 60 (FIG. 1). With these plus voltage inputs present, the output from logic element 172 will be a plus or zero voltage, depending on the information (binary "one" or "zero") stored in memory data register 104. If the voltage in memory data register 104 is a positive voltage, then the output from element 172 will be a zero voltage; if memory data register 104 contains a zero voltage, then the output from element 172 will be a positive voltage. At the same time, element 170 supplies a plus voltage to element 174 because the decoder line 154 connected thereto supplies a zero voltage. Assuming a plus voltage is supplied by register 104, resulting in a zero voltage being supplied by the logic element 172 to logic element 174, it follows that a plus voltage will be supplied by the logic element 174 to the information driver 142. Thus, the information driver 142 is supplied with the same type of voltage signal supplied by the memory data register 104.

In the case of a zero voltage being supplied by the memory data register 104, resulting in a plus voltage being supplied by element 172 of element 174, it is necessary that the element 170 supply a plus voltage to the element 174 in order for a zero voltage to be transmitted to driver 142. The element 170 will supply a plus voltage to the element 174 provided that one of its inputs is a zero voltage. The line 154, as mentioned above, will supply a zero voltage to the element 170 when data is to be transferred from memory data register 104 to longitudinal driver 142, that is when a defective position is not present in the data storage section. Thus, a zero voltage is transferred from the register 104 to driver 142.

If a defective storage position is associated with driver 140, the line 154 from the decoder 110 will supply a plus voltage to the element 170 of write gate 114, as well as to element 180 of write gate 116. A zero voltage is supplied by decoder line 152 to element 172, resulting in a plus voltage being supplied to element 174. With this input from element 172, the output of element 174 is determined by the input from element 170. With line 154 and line T supplying plus voltages, the input from element 170 is determined by the input line 130 from memory register 102. Thus the data from register 102 is supplied to element 174 and driver 142. In a similar manner, the data from register 104 is shifted to driver 144 via element 180 and 182. Briefly, this shifting is accomplished by output line 134 of memory data register 104, decoder line 154, and timing line T supplying input signals to the logic element 180, which in turn supplies its output to logic element 182. Since the logic element 182 receives plus voltages from the elements 184 and 186 as a result of their being supplied by zero voltages by line 156 and 152, respectively, it in turn supplies an output signal in accordance with the signal from element 180. Element 180 in turn is controlled by the signal from memory data register 104 since plus voltages are supplied by lines 154 and T. The output signal from element 182 is supplied to information driver 144 by the output line 88.

From this brief description of the write gate construction and operation, the operation of the read gates should be obvious, as they operate according to the same general logic and employ the same elements. Briefly, when data has been stored in the spare storage section during readout, it is transferred to the memory data register 106 and then supplied to the output cable driver 126 via the logic elements 190, which is supplied with a plus voltage by the decoder line 156, through element 192. When data is not stored in the spare storage section, it is transferred from the data storage section to register 104 and to the output cable driver 126 via logic elements 194 and 192. In either case, where there is a defective data storage section and the data is stored in the spare storage section or where the data storage section is functioning properly and data is stored therein, the output cable driver 126 will supply an output signal as if it were stored in the data storage section. The remaining details of the logic arrangement should be obvious from this brief description and the above description of the write gates.

If a defective storage position is associated with driver 142 then during the write operation, the information in register 104 is supplied to information driver 144 while register 102 and driver 140 cooperate in a normal manner. The transfer from register 104 to driver 144 is accomplished by the line 156 supplying a plus voltage to element 184. Since element 182 with positive inputs from elements 180 and 186 functions as an inverting "or" logic device, element 184 may supply an output from register 104 to driver 144 as discussed above. The decoder arrangement as shown has only one of the lines 152, 154 or 156 plus at any given time corresponding to the bad bit location as obtained from address storage section 76 (FIG. 2). Thus it can be seen that when a defective position is associated with the driver 142, the information in memory data register 104 is transferred via the driver 144 to the associated spare bit position, while the information in memory data register 102 is transferred in the normal manner by driver 140 to the associated storage position.

It is worth mentioning at this point that during readout, the line 156 transmits a plus voltage to element 190 to control the output from element 192 to output driver 126 in accordance with the input from register 106. Thus the information stored in the spare bit position is read out as it was stored in the data storage section. It should also be noted that the drivers 140, 142 and 144, notwithstanding the fact they may be associated with a defective storage position, may remain energized during the write operation as the attempted write operation into a defective storage position will in no way interfere with proper storage in the other positions.

With the entire system organization in mind, the significant aspects of the invention can best be understood by a summary explanation of the operation of the memory system. Referring to FIGS. 1–3, information is read into storage device 30, and more particularly a word containing a plurality of discrete positions and organized into an address storage section, a data storage section, and a spare storage section. The address storage section contains a previously written address representative of the existence and location of a defective position in the data storage section 72. Assuming a defective position to exist in the data storage section 72, during the write operation the address in the address storage section 76 is read out and supplied to logic means 78 via sense means **50*a*. Logic means 78, utilizing address register 108, decoder 110, memory data registers 102–106 and write gates 112–116, enables information driver 40 to write information into data storage section 72 and spare storage section 74. Information is stored in all available positions with the exception that the information that would normally be stored in the defective position in data storage section 72 is transferred to a non-defective section. Information driver 40 accomplishes the storage of data in storage device 30 by acting in cooperation with the word driver and selection device 20** according to well known magnetic core memory techniques.

During readout, the address in address storage section 76 is again first read out and transmitted to logic means 78 via sense means **50*a*. While this is occurring, the data stored in data storage section 72 and spare storage section 74 is transmitted to logic means 78 via sense means 50*b* (FIG. 2). The address signal transmitted to logic means 78 enables the read gates 118 and 120 (FIG. 3). These gates acting in cooperation with the address register 108, decoder 110, and memory data register 102–106 transfer the data stored in spare storage section 74 and data storage section 72 to the cable driver means 80 (FIG. 2), and more particularly to cable drivers 124 and 126 (FIG. 3). This transfer of data is accomplished as if a defective position did not exist in the data storage section. The output cable driver means 80 supplies output signals to output terminals 96** (FIG. 2).

From the above detailed description, it will be seen that the object of the invention has been accomplished. A memory storage device has been described which does not require the repair of defective positions. This result is accomplished by the described shifting to a spare storage section. As explained, a word may be organized into a discrete number of sections which include a plurality of discrete positions. For example, a seventy-six position word can be utilized including four address positions, eight data storage sections, each including eight positions, and a spare storage section also including eight positions. If a defective bit exists in any one of the eight data storage sections, the entire eight positions that would normally be stored in the section containing the defective bits would be shifted to a section having no defective positions. Spare storage section 74 would be utilized for this purpose. It is, of course, possible to include more positions or sections for spare storage to provide for the case of more than one defective position located in two different sections of the data storage section or for a defective spare storage position. It is also possible to break the word into smaller or larger sections including more or fewer address positions to identify the defective position. The more address positions, the fewer spare positions required to correct for a single error. The complexity of the gating arrangement and decoder increases with the increase in address positions and the number of positions which are to be addressed.

In addition to enabling the fabrication of a memory not requiring repair, the invention adds only a slight delay to the operation of the memory device. This delay occurs incident to the operation of the write and read gates and to the decoding. Finally, the structure added to the usual memory storage device is relatively simple and inexpensive.

While the fundamental novel features of the invention have been shown and described as applied to an embodiment, it will be understood that many substitutions, omissions, and changes in the details of the device illustrated and in its operation may be made by those skilled in the art without departing from the spirit and scope of the invention. It is the intention therefore to be limited only as indicated by the following claims.

What is claimed is:

1. In a memory system, the combination comprising:

(a) a storage array means for storing information in discrete positions, each word of said array means organized into a data storage section, a spare storage section, and an address storage section, said data storage section comprising a plurality of discrete positions for the regular storage of data, said spare storage section for the storage of data when said data storage section has a defective position, said address section for the storage of the address of any defective position, (b) a sense means for sensing an address stored in said address section and for supplying an output representative of said address, said sensing means operatively coupled to said address section, (c) input terminals for receiving input data, (d) register means for temporarily storing addresses and input data from said input terminals, said register means operatively coupled to said sense means and said input terminals, (e) information driver means for writing data supplied to said input terminals into said data storage section and said spare storage section, said information driver means having separate means associated with said spare storage section and said data storage section, (f) write gate means for normally coupling said register means to said separate means of the information driver means associated with said data storage section, and for shifting said coupling to couple said separate means of the information driver means associated with said spare storage section to said register means when said data storage section has a defective position, said write gate means coupled to said write amplifier means and said register means, and (g) a decoder means coupled to said register means for decoding any address temporarily stored in said register means and for enabling said write gate means to couple said register means to said separate means associated with said spare storage section when said address indicates a defective position exists in said data storage section and a write operation in commenced, whereby the storage of data in defective portions of said magnetic array means is avoided.

2. In a memory device, a combination comprising:

(a) a thin film means for storing data and addresses in discrete positions, each word of said thin film means organized into a data storage section, a spare storage section, and an address section, said data storage section comprising a plurality of discrete positions for the regular storage of data, said spare storage section for the storage of data when said data storage section has a defective position, said address section for the storage of the address of any defective position, (b) a sense means for sensing information stored in said data storage section, said spare storage section, and said address section and for supplying an output representative of said data and said addresses, said sense means operatively coupled to said thin film means, (c) input terminals and output terminals for (d) memory data register means for temporarily storing data transferred to and from said thin film means, said register means operatively coupled to said sense means so that in said data storage section and said spare storage section is transferred thereto, said register means operatively coupled to said input terminal so that input data may be transferred to said register means, (e) address register means for temporarily storing said addresses of said address section, said address register means operatively coupled to said sense means so that the addresses in said address section are transferred thereto, (f) information driver means for writing data supplied to said input terminals into said data storage section and said spare storage section, said information driver means having separate means associated with said data storage section and said spare storage section, (g) output cable driver means for transmitting said data transferred from said sense means to said memory data register means to said output terminals, said cable driver means operatively coupled to said output terminals.

(h) write gate means for normally coupling said memory data register means to said separate means associated with said data storage section and for shifting said coupling to said separate means associated with said spare storage section when said data storage section has a defective position, (i) read gate means for normally coupling said storage section data in said memory data register means to said cable driver means and for shifting said coupling to said spare storage section data in said memory data register means when said data storage section has a defective position so that said cable drive means receives the same data notwithstanding the existence of a defective position, and (j) a decoder means coupled to said address register means for decoding the information stored in said address register means for enabling said write gate means to couple said memory data register means to said separate means associated with said spare storage section when said address indicates a defective position exists in said data storage section and a write operation is commenced and for enabling the read gate means to couple said memory data register means having spare storage section data to said cable driver means when a defective position exists in said data storage section and a read operation is commenced, whereby the existence of defective positions in said data storage section does not affect the accuracy of the thin film means.

3. In a memory system, the combination comprising:

magnetic storage device for storing information having a number of discrete positions, a plurality of said discrete positions for the regular storage of said information, at least one of said number of discrete positions for spare storage when any position for regular storage is defective and other positions for storing the address of any defective position;

(a) sense means coupled to said storage device for reading out a defective position address and supplying a representative output signal;

(b) information driver means for normally storing data in said regular storage positions and for storing data in said spare stored positions when enabled, said information driver means coupled to said magnetic storage device; and (c) logic means coupled to said sense means and said information driver means for decoding any stored address of a defective position and for enabling said driver means to store data in said spare storage position in accordance with the decoded address, whereby information may be stored in positions for the regular storage or in positions for spare storage when a position for regular storage is defective.

References Cited

UNITED STATES PATENTS

| | | | |
|---|---|---|---|
| 3,222,653 | 12/1964 | Rice | 340—172.5 |
| 3,228,005 | 1/1966 | Delmege et al. | 340—172.5 |
| 3,234,521 | 2/1966 | Weisbecker | 340—172.5 |
| 3,264,615 | 8/1966 | Case et al. | 340—172.5 |
| 3,292,151 | 12/1966 | Barnes et al. | 340—172.5 |

ROBERT C. BAILEY, *Primary Examiner.*

PAUL J. HENON, *Examiner.*